United States Patent
Zhang

(10) Patent No.: US 12,399,873 B2
(45) Date of Patent: Aug. 26, 2025

(54) METHOD AND SYSTEM FOR SYNTHESIZING DATA GRAVITY WITHIN AN INCOMPLETE DUPLICATE INSTANCE OF A VERY LARGE DATABASE

(71) Applicant: JPMorgan Chase Bank, N.A., New York, NY (US)

(72) Inventor: Lance Zhang, Edison, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 17 days.

(21) Appl. No.: 18/387,194

(22) Filed: Nov. 6, 2023

(65) Prior Publication Data
US 2025/0147935 A1 May 8, 2025

(51) Int. Cl.
*G06F 17/00* (2019.01)
*G06F 7/00* (2006.01)
*G06F 16/21* (2019.01)
*G06F 16/23* (2019.01)

(52) U.S. Cl.
CPC ........ *G06F 16/214* (2019.01); *G06F 16/2358* (2019.01)

(58) Field of Classification Search
CPC ............................ G06F 16/214; G06F 16/2358
USPC ......................................................... 707/609
See application file for complete search history.

(56) References Cited

U.S. PATENT DOCUMENTS

| | | | |
|---|---|---|---|
| 2003/0037029 A1* | 2/2003 | Holenstein | G06F 16/2343 |
| 2005/0114505 A1* | 5/2005 | DeStefano | H04L 63/1416 709/224 |
| 2005/0114707 A1* | 5/2005 | DeStefano | H04L 63/1416 726/4 |
| 2008/0114816 A1* | 5/2008 | Shepherd | G06F 16/275 |
| 2016/0203050 A1* | 7/2016 | Hrle | G06F 11/1402 707/625 |
| 2018/0285201 A1* | 10/2018 | Bangalore | G06F 11/2097 |
| 2022/0253334 A1* | 8/2022 | Nakamura | G06F 9/4893 |
| 2023/0090266 A1* | 3/2023 | Zhang | H04L 67/10 707/615 |

\* cited by examiner

*Primary Examiner* — Pavan Mamillapalli
(74) *Attorney, Agent, or Firm* — Greenblum & Bernstein, P.L.C.

(57) ABSTRACT

A system comprising a processor that may be configured to: monitor an output of a feed that outputs a respective log of each activity that occurs on a source database platform; evaluate the output of the feed against an update session taxonomy to determine whether the respective log indicates a completion of a first update session of first updates to a first source table of a source instance of a live database; when the respective log indicates the completion of the first update session, search a historical database activity repository to detect each respective log that corresponds to the first update session; identify a corresponding data change for each respective log that corresponds to the first update session; and perform a first set of data changes on a copy of the first source table.

20 Claims, 4 Drawing Sheets

METHOD AND SYSTEM FOR SYNTHESIZING DATA GRAVITY WITHIN AN INCOMPLETE DUPLICATE INSTANCE OF A VERY LARGE DATABASE

BACKGROUND

1. Field of the Invention

The field of the invention disclosed herein generally relates to a very large database's migration to a new platform and, more particularly, it relates to a method, system, and computer-readable storage medium for implementing technology for synchronizing at least a portion of an incomplete copy of the very large database with that portion of a source instance of the database.

2. Background of the Invention

The migration of a typical large database requires the transmission of a large amount of information over a communication network. However, conventional approaches to such migrations suffer from significant drawbacks due to the vast amounts of data that they require to be transferred. For example, a standard migration of a database storing 100 terabytes (100 TB) of data will usually take a minimum of 100 days to complete over a 100-Mbps connection to the network. Therefore, such a migration can take a 100 TB-database offline (e.g., by rendering inaccessible) for more than three months, which can devastate an entire season (or fiscal quarter, for example) of the service/utility provided by the database, if not worse.

Some migration approaches attempt to compensate for this drawback by keeping the database online during its migration. However, such approaches raise data integrity issues because content that has already been migrated may then be changed before the migration completes, and database application(s) responsible for such change(s) is/are more (or most) attracted to the more (or most) complete copy of the migration (which is generally the source copy of a database as opposed to a target copy). Moreover, even after such a migration is complete, the database's application(s) may still likely be more attracted to the source copy of a migrated database because, as exemplified above, the data within a recently migrated 100 TB-database can still be as many as three months out of date.

Accordingly, there is a need in the field of the herein-disclosed invention for a technical solution to the foregoing limitation(s) in the technology of existing approaches for the migration of a very large database to a new platform.

SUMMARY

The present disclosure, through one or more of its various aspects, embodiments, and/or specific features or sub-component, provides, inter alia, various systems, servers, devices, methods, media, programs and platforms for implementing a live database activity reflection tool that synchronizes at least one copy of a live database's most frequently accessed tables with a source instance of that database's most frequently accessed tables.

According to an aspect of the present disclosure, a method is provided for synchronizing a copy of at least one first source table of a live database with a source instance of the at least one first source table. The method may comprise: monitoring an output of a feed that outputs a respective log of each activity that occurs on a source database platform; evaluating the output of the feed against an update session taxonomy to determine whether the respective log indicates a completion of a first update session of first updates to the at least one first source table of a source instance of the live database; when the respective log indicates the completion of the first update session, searching a historical database activity repository to detect each respective log that corresponds to the first update session; based on the update session taxonomy and corresponding logs of the first update session, identifying a corresponding data change classification for the first update session; determining the first set of data changes based on the corresponding data change classification and the corresponding logs of the first update session; and performing a first set of data changes on the copy of the at least one first source table. The first update session may comprise the first set of data changes, and the copy of the at least one first source table may be stored within a target database platform.

The method may further comprise restoring a connection to the output of the feed. When the feed is not offline, each respective log may be generated and outputted by the feed immediately after each activity is completed, and when the feed is offline, the output of the feed may be buffered and the buffered output of the feed may be outputted immediately after the restoring.

In the method, the at least one first source table may comprise a set of frequently accessed tables.

In the method, each respective log that corresponds to the first update session may be determined by an artificial intelligence and machine learning (AI/ML) model that has been trained based on each distinct set of update session logs that has been categorized as a distinct type of update session.

In the method, the update session taxonomy may be created and refined by the AI/ML model based on update session training data.

In the method, the evaluating may further comprise utilizing the AI/ML model to determine whether the respective log indicates the completion of the first update session.

The method may further comprise retraining the AI/ML model based on a set of historical database activity logs that has been categorized as a new type of update session.

In the method, the performing may further comprise: transforming the first set of data changes into a first set of corresponding steps; and incorporating the first set of data changes into the copy of the at least one first source table by having the first set of corresponding steps executed with respect to the target database platform.

In the method, the respective log may indicate the completion of the first update session after the update session taxonomy has been utilized to determine that a set of previously generated logs indicate that the first update session exists, and an alert may be issued when the completion of the first update session has not been detected after a predetermined duration of time elapses subsequent to a determination that the set of previously generated logs indicate that the first update session exists.

The method may further comprise: determining that the respective log comprises at least one from among a set of database activities that includes insert, update, delete, collect statistics and begin transaction; and storing, within the historical database activity repository, the respective log after the feed outputs the respective log.

The method may further comprise associating the first update session with a first set of logs that comprises each respective log that corresponds to the first update.

According to another aspect of the present disclosure, a system is provided for synchronizing a copy of at least one first source table of a live database with a source instance of the at least one first source table. The system may comprise a processor and memory that stores instructions that, when executed by the processor, cause the processor to perform operations that may comprise: monitoring an output of a feed that outputs a respective log of each activity that occurs on a source database platform; evaluating the output of the feed against an update session taxonomy to determine whether the respective log indicates a completion of a first update session of first updates to the at least one first source table of a source instance of the live database; when the respective log indicates the completion of the first update session, searching a historical database activity repository to detect each respective log that corresponds to the first update session; based on the update session taxonomy and corresponding logs of the first update session, identifying a corresponding data change classification for the first update session; determining the first set of data changes based on the corresponding data change classification and the corresponding logs of the first update session; and performing the first set of data changes on the copy of the at least one first source table. The first update session may comprise the first set of data changes, and the copy of the at least one first source table may be stored within a target database platform.

In the system, when executed by the processor, the instructions cause the processor to perform further operations that may comprise restoring a connection to the output of the feed. The first set of data changes may comprise the corresponding data change of each respective log that corresponds to the first update session, when the feed is not offline, each respective log may be generated and outputted by the feed immediately after each activity is completed, and when the feed is offline, the output of the feed may be buffered and the buffered output of the feed may be outputted immediately after the restoring.

In the system, when the instructions are executed by the processor, the at least one first source table may comprise a set of frequently accessed tables.

In the system, when the instructions are executed by the processor, each respective log that corresponds to the first update session may be determined by an AI/ML model that has been trained based on each distinct set of update session logs that has been categorized as a distinct type of update session.

In the system, when the instructions are executed by the processor, the update session taxonomy may be created and refined by the AI/ML model based on update session training data.

In the system, when the instructions are executed by the processor, the evaluating may further comprise utilizing the AI/ML model to determine whether the respective log indicates the completion of the first update session.

In the system, when executed by the processor, the instructions cause the processor to perform further operations that may comprise retraining the AI/ML model based on a set of historical database activity logs that has been categorized as a new type of update session.

In the system, when the instructions are executed by the processor, the performing may further comprise transforming the first set of data changes into a first set of corresponding steps, and incorporating the first set of data changes into the copy of the at least one first source table by having the first set of corresponding steps executed with respect to the target database platform.

In the system, when the instructions are executed by the processor, the respective log may indicate the completion of the first update session after the update session taxonomy has been utilized to determine that a set of previously generated logs indicate that the first update session exists, and an alert may be issued when the completion of the first update session has not been detected after a predetermined duration of time elapses subsequent to a determination that the set of previously generated logs indicate that the first update session exists.

In the system, when executed by the processor, the instructions cause the processor to perform further operation that may comprise: determining that the respective log comprises at least one from among a set of database activities that includes insert, update, delete, collect statistics and begin transaction; and storing, within the historical database activity repository, the respective log after the feed outputs the respective log.

In the system, when executed by the processor, the instructions cause the processor to perform further operations that may comprise associating the first update session with a first set of logs that comprises each respective log that corresponds to the first update.

According to yet another aspect of the present disclosure, a non-transitory computer-readable storage medium is provided for synchronizing a copy of at least one first source table of a live database with a source instance of the at least one first source table. The computer-readable storage medium stores instructions that, when executed by a processor, cause the processor to perform operations that may comprise: monitoring an output of a feed that outputs a respective log of each activity that occurs on a source database platform; evaluating the output of the feed against an update session taxonomy to determine whether the respective log indicates a completion of a first update session of first updates to the at least one first source table of a source instance of the live database; when the respective log indicates the completion of the first update session, searching a historical database activity repository to detect each respective log that corresponds to the first update session; based on the update session taxonomy and corresponding logs of the first update session, identifying a corresponding data change classification for the first update session; determining the first set of data changes based on the corresponding data change classification and the corresponding logs of the first update session; and performing a first set of data changes on the copy of the at least one first source table. The first update session may comprise the first set of data changes, and the copy of the at least one first source table may be stored within a target database platform.

In the computer-readable storage medium, when executed by the processor, the instructions cause the processor to perform further operations that may comprise: restoring a connection to the output of the feed. When the feed is not offline, each respective log may be generated and outputted by the feed immediately after each activity is completed, and when the feed is offline, the output of the feed may be buffered and the buffered output of the feed may be outputted immediately after the restoring.

In the computer-readable storage medium, when the instructions are executed by the processor, the at least one first source table may comprise a set of frequently accessed tables.

In the computer-readable storage medium, when the instructions are executed by the processor, each respective log that corresponds to the first update session may be determined by an AI/ML model that has been trained based on each distinct set of update session logs that has been categorized as a distinct type of update session.

In the computer-readable storage medium, when the instructions are executed by the processor, the update session taxonomy may be created and refined by the AI/ML model based on update session training data.

In the computer-readable storage medium, when the instructions are executed by the processor, the evaluating may further comprise utilizing the AI/ML model to determine whether the respective log indicates the completion of the first update session.

In the computer-readable storage medium, when executed by the processor, the instructions cause the processor to perform further operations that may comprise retraining the AI/ML model based on a set of historical database activity logs that has been categorized as a new type of update session.

In the computer-readable storage medium, when the instructions are executed by the processor, the performing may further comprise transforming the first set of data changes into a first set of corresponding steps, and incorporating the first set of data changes into the copy of the at least one first source table by having the first set of corresponding steps executed with respect to the target database platform.

In the computer-readable storage medium, when the instructions are executed by the processor, the respective log may indicate the completion of the first update session after the taxonomy has been utilized to determine that a set of previously generated logs indicate that the first update session exists, and an alert may be issued when the completion of the first update session has not been detected after a predetermined duration of time elapses subsequent to a determination that the set of previously generated logs indicate that the first update session exists.

In the computer-readable storage medium, when executed by the processor, the instructions cause the processor to perform further operations that may comprise: determining that the respective log comprises at least one from among a set of database activities that includes insert, update, delete, collect statistics and begin transaction; and storing, within the historical database activity repository, the respective log after the feed outputs the respective log.

In the computer-readable storage medium, when executed by the processor, the instructions cause the processor to perform further operations that may comprise associating the first update session with a first set of logs that comprises each respective log that corresponds to the first update.

Thereby, the invention disclosed herein improves existing technology by implementing a live database activity reflection tool that synthesizes data gravity within at least one copy of a live database's most frequently accessed tables by reflecting a source instance of those tables onto the copy and, thereby, enables expedited migrations of processes running on the live database.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
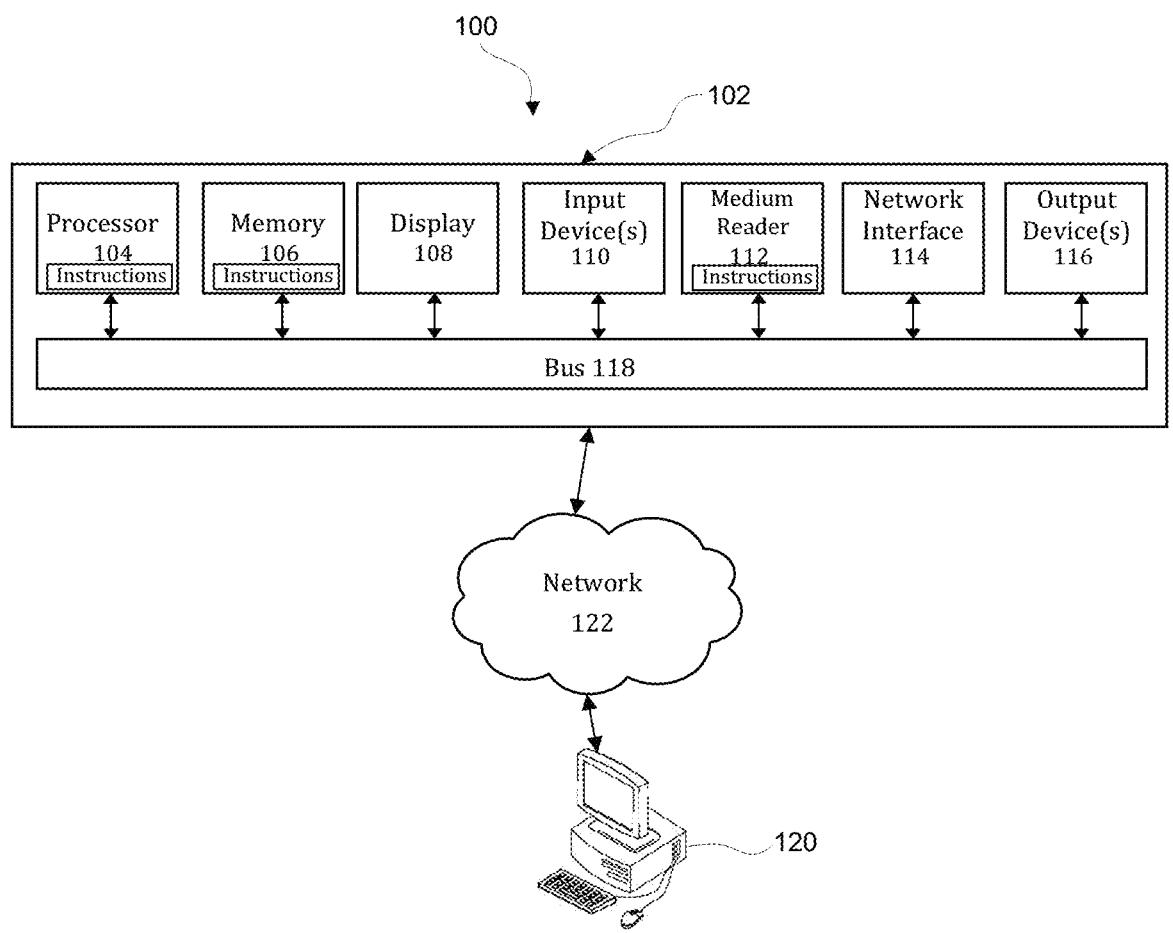
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a live database activity reflection tool that synchronizes at least one duplicate instance (or copy) of a set of a very large database's tables with the source instance of that database's tables during a migration of the very large database to the at least one duplicate instance's platform.

Figure 2:
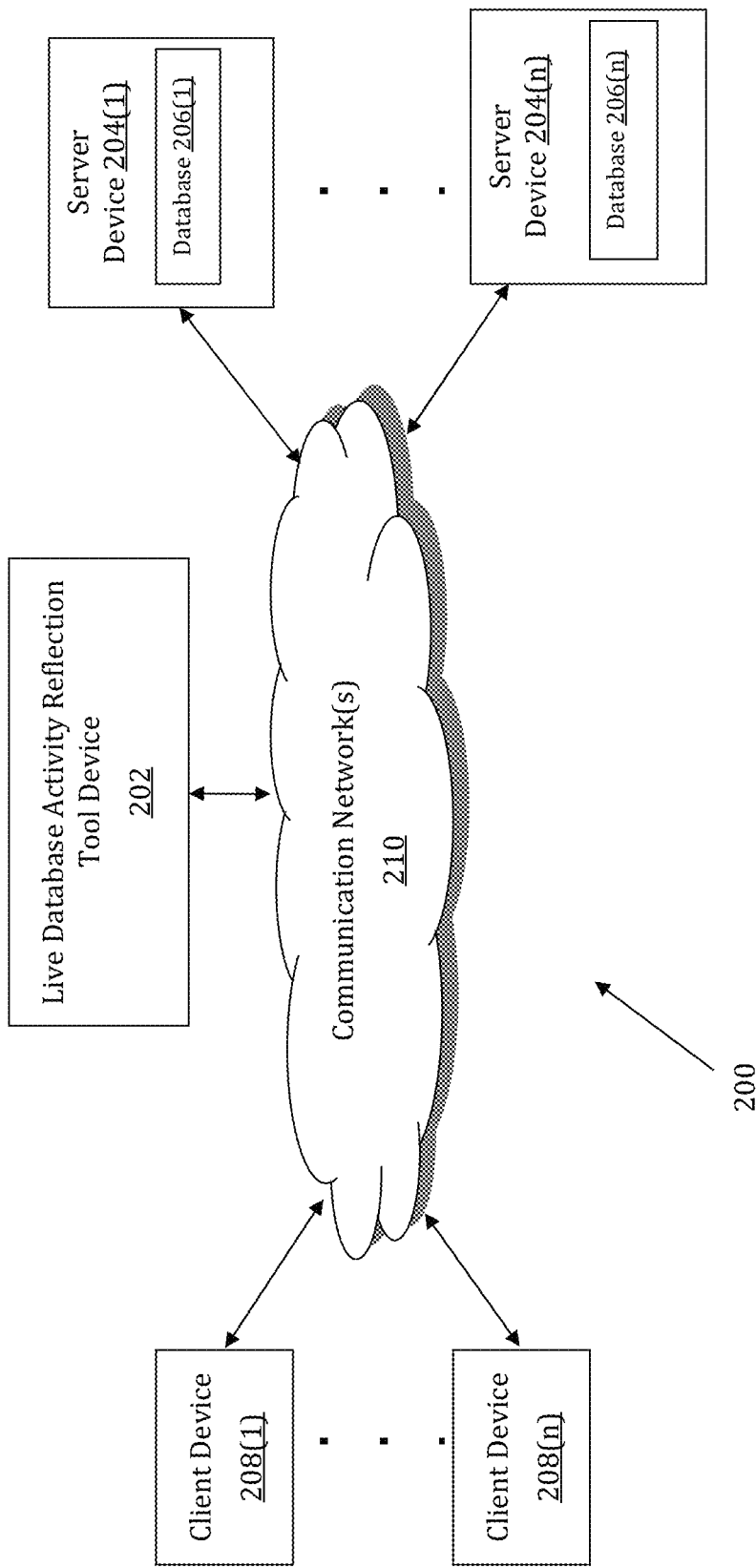
FIG. 2 is a diagram of an exemplary network environment for synchronizing a copy of a set of a live database's tables with a source instance of the live database's tables.

Referring to FIG. 2, a schematic of an exemplary network environment 200 depicts an exemplary network environment for synchronizing at least one copy of a set of a live database's tables on at least one new platform, with a source instance of the database's tables from a source database platform. In an exemplary embodiment, a live database activity reflection tool may be implemented on any networked computer platform, such as, for example, a personal computer (PC).

A method for synchronizing a copy of a set of a very large database's frequently accessed tables on a new platform, with a source instance of the database's tables from a source database platform may be implemented by a Live Database Activity Reflection Tool (LDART) device 202. The LDART device 202 may be the same or similar to the computer system 102 as described with respect to FIG. 1. The LDART device 202 may be a rack-mounted server in a datacenter, an embedded microcontroller (MCU) in an electronic device, or another type of headless system, which is a computer system or device that is configured to operate without a monitor, keyboard and mouse. The LDART device 202 may store one or more applications that can include executable instructions that, when executed by the LDART device 202, cause the LDART device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LDART device 202 itself, may be located in virtual server(s) running in a cloud-based computing environment rather than being tied to one or more specific physical network computing devices. Also, the application(s) may be running in one or more virtual machines (VMs) executing on the LDART device 202. Additionally, in one or more embodiments of this technology, virtual machine(s) running on the LDART device 202 may be managed or supervised by a hypervisor.

In the network environment 200 of FIG. 2, the LDART device 202 is coupled to a plurality of server devices 204(1)-204(n) that hosts a plurality of databases 206(1)-206(n), and also to a plurality of client devices 208(1)-208(n) via communication network(s) 210. A communication interface of the LDART device 202, such as the network interface 114 of the computer system 102 of FIG. 1, operatively couples and communicates between the LDART device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LDART device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and LDART devices that efficiently implement a method for a live database activity reflection tool that synchronizes at least one duplicate instance (or copy) of a set of a very large database's most frequently accessed tables with the source instance of that database's most frequently accessed tables during a migration of the very large database to the at least one duplicate instance's platform.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LDART device 202 may be a standalone device or integrated with one or more other devices or apparatuses, such as one or more of the server devices 204(1)-204(n), for example. In one particular example, the LDART device 202 may include or be hosted by one of the server devices 204(1)-204(n), and other arrangements are also possible. As another example, the LDART device 202 may be integrated with one or more other devices or apparatuses, such as one or more of the client devices 208(1)-208(n). Moreover, one or more of the devices of the LDART device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LDART device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the LDART device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LDART device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the LDART device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LDART device 202, the server devices 204(1)-204(n), the databases 206(1)-206(n), or the client devices 208(1)-208(n), for example, may be configured to operate as virtual instances on the same physical machine. In other words, one or more of the LDART device 202, the server devices 204(1)-204(n), the databases 206(1)-206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
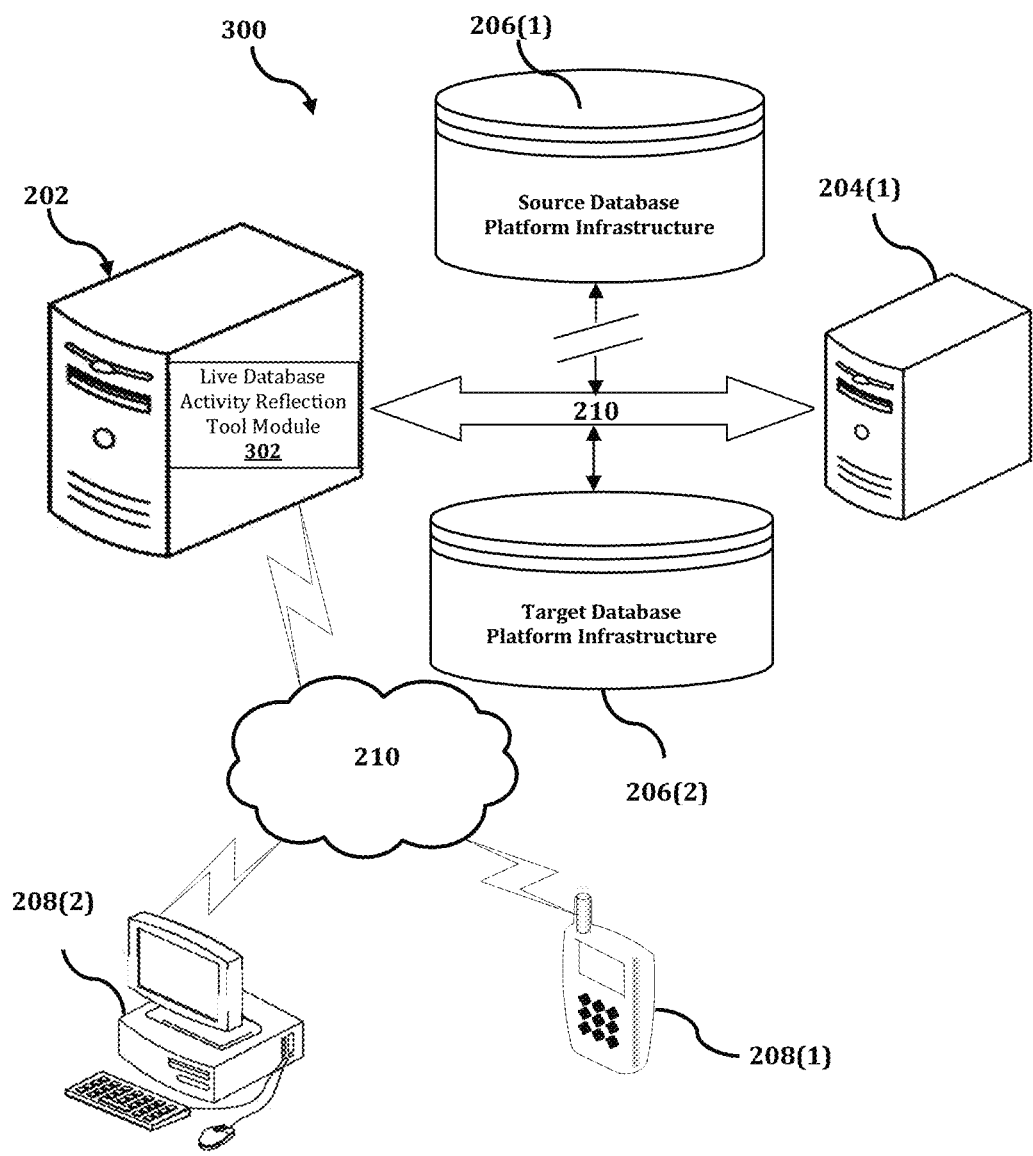
FIG. 3 is a diagram of an exemplary perspective of a network environment that synchronizes at least one copy of a set of a live database's tables with a source instance of the live database's tables.

The LDART device 202 is described and illustrated in FIG. 3 as including live database activity reflection tool module 302, although it may include other rules, policies, modules, databases, or applications, for example. As will be described below, live database activity reflection tool module 302 is configured to synchronize at least one copy of a set of a live database's tables, with a source instance of that database's tables. Live database activity reflection tool module 302 may include software that is based on a microservices architecture.

Live database activity reflection tool module 302 may be integrated with one or more devices or apparatuses, such as client devices 208(1)-208(n), where live database activity reflection tool module 302 may be implemented as an application or as an addon or plugin to another application of the one or more devices or apparatuses, and where live database activity reflection tool module 302 may execute in the background.

An exemplary process 300 for application of a live database activity reflection tool to an aspect of the network environment of FIG. 2 is illustrated as being executed in FIG. 3. Specifically, a first client device 208(1) and a second client device 208(2) are illustrated as being in communication with LDART device 202. In this regard, the first client device 208(1) and the second client device 208(2) may be "clients" of the LDART device 202 and are described herein as such. Nevertheless, it is to be known and understood that the first client device 208(1) and/or the second client device 208(2) need not necessarily be "clients" of the LDART device 202, or any entity described in association therewith herein. Any additional or alternative relationship may exist between either or both of first client device 208(1), second client device 208(2) and LDART device 202, or no relationship may exist.

Further, LDART device 202 is illustrated as being able to access source database platform infrastructure 206(1), and target database platform infrastructure 206(2). LDART device 202 may comprise live database activity reflection tool module 302, which communicates with source database platform infrastructure 206(1). In addition, live database activity reflection tool module 302 of LDART device 202 may also communicate with target database platform infrastructure 206(2). Live database activity reflection tool module 302 may be configured to access these databases in order to synchronize at least one target instance of a very large database with the source instance of that database during its migration to the target instance's platform.

Moreover, LDART device 202 may receive and transmit data via communication network(s) 210. LDART device 202 may receive and transmit data such as code that is written in one or more of the following dialects: transaction control language (TCL), data manipulation language (DML), data control language (DCL) and data definition language (DFL). Additionally, via communication network(s) 210, LDART device 202 may respectively receive and transmit data from and to one or more from among the following devices: server device 204, source database platform infrastructure 206(1), target database platform infrastructure 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the LDART device 202 via broadband or cellular communication. Of course, these embodiments are merely exemplary and are not limiting or exhaustive.

Live database activity reflection tool module 302 may execute a process that synchronizes at least one duplicate instance (or copy) of a set of a very large database's most frequently accessed tables with the source instance of that database's most frequently accessed tables during a migration of the very large database to the at least one duplicate instance's platform(s). An exemplary process for a live database activity reflection tool is generally indicated at flowchart 400 in FIG. 4.

Figure 4:
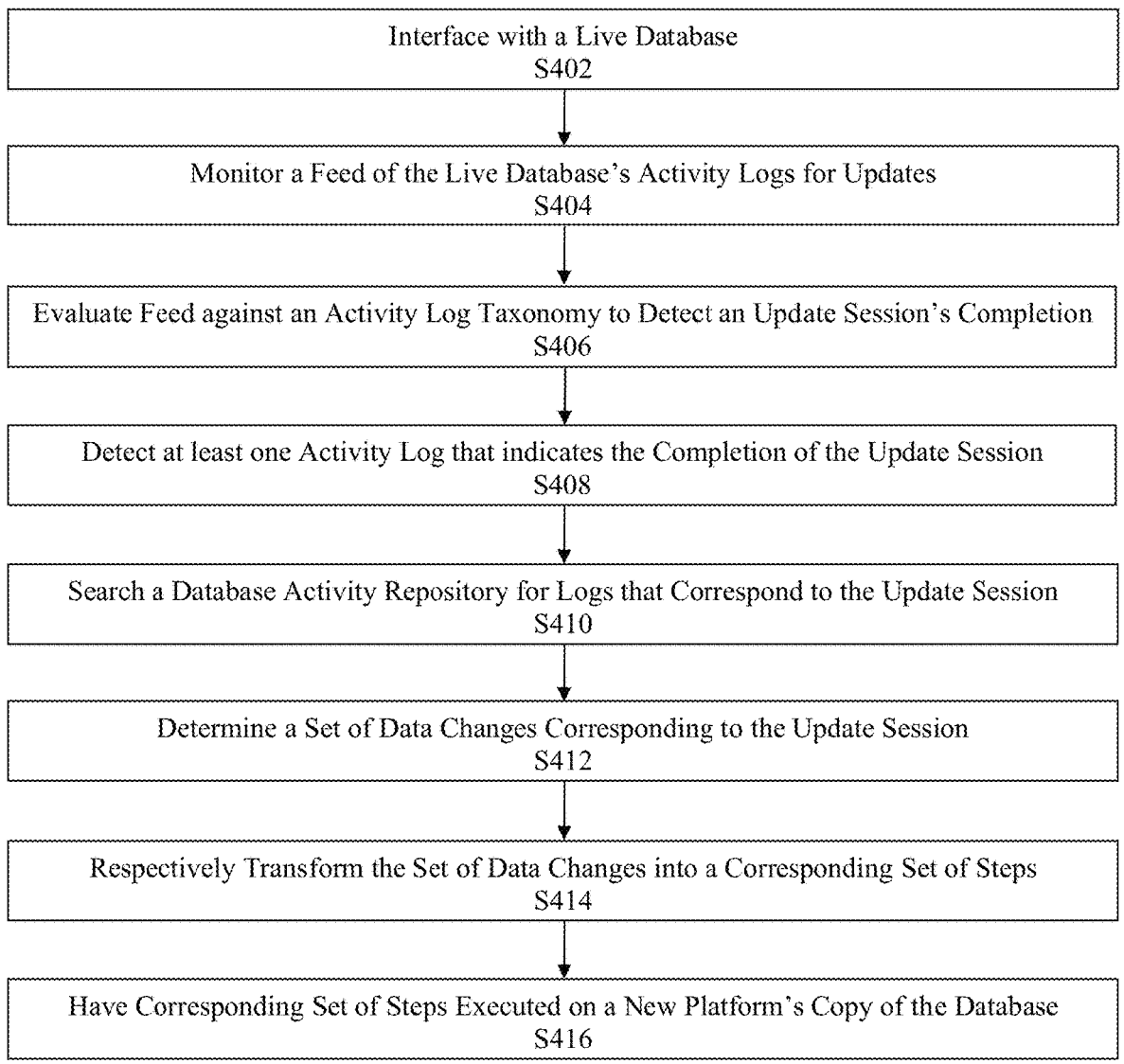
FIG. 4 is a flowchart of an exemplary process for synchronizing at least one copy of a set of a live database's tables on at least one new platform, with a source instance of the live database's table on a source instance platform.

In process 400 of FIG. 4, at step S402, live database activity reflection tool module 302 interfaces with at least one first database that comprises a live database and is hosted on at least a first database platform's infrastructure. In other words, at step S402, live database activity reflection tool module 302 is configured to communicate with at least the first database platform to access the at least one first database, which comprises the live database. It should be noted that, for the purposes of this disclosure, a live database may refer to a particular database that is actively accessed and updated by various client devices (e.g., 208(1)-208(n)) and/or processes of the particular database.

In an embodiment, at step S402, live database activity reflection tool module 302 may also interface with at least one second database platform's infrastructure. However, live database activity reflection tool module 302 may alternatively or additionally interface with the at least one second database platform's infrastructure during a subsequent step (such as step S416, for example). Accordingly, in this embodiment, live database activity reflection tool module 302 may interface with the at least one first database and the at least one second database to synchronize a set of the at least one second database's tables with any relevant activity that occurs on the at least one first database.

In an exemplary embodiment, to expedite a migration of a set of a live database's processes from at least the first database platform to at least the second database platform, live database activity reflection tool module 302 may utilize the interface that is established at step S402 to synthesize data gravity within the at least one second database by synchronizing the set of the at least one second database's tables with the at least one first database's activities.

Accordingly, in the exemplary embodiment, the at least one first database may comprise at least one source database for a migration of the live database, and the at least one second database may comprise at least one target database for the live database's migration. For example, the at least one first database may comprise at least one from among databases 206(1)-206(n), such as source database platform infrastructure 206(1), and the at least one second database may comprise at least one from among databases 206(1)-206(n), such as target database platform infrastructure 206(2).

In the exemplary embodiment, the set of the at least one second database's tables may comprise one or more of the most frequently accessed tables of the live database. Additionally, or alternatively, the set of the at least one second database's tables may comprise one or more of the live database tables that are required by the set of the live database's processes that are to be migrated. Furthermore, the set of the at least one second database's tables may additionally or alternatively comprise one or more tables that are otherwise required by the live database's activities.

In process 400, after step S402's interface with the live database, at step S404, live database activity reflection tool module 302 begins monitoring an output of a feed of the at least one first database platform. This feed outputs a respective log of each activity that occurs on the at least one first database platform including the live database. To conserve compute resources, at step S404, live database activity reflection tool module 302 may only monitor activities that pertain to infrastructure of the live database that is stored on the at least one first database platform.

In an exemplary embodiment, live database activity reflection tool module 302 may record each outputted log that meets one or more specified criterion, and each outputted log recorded by live database activity reflection tool module 302 may be recorded in a repository of the live database's activity. In the exemplary embodiment, the specified criteria may indicate that data has been changed within the live database that is stored on the at least one first database platform. For example, live database activity reflection tool module 302 may record each outputted log that concerns any activities within the live database that include at least one of the following operations: insert, update, delete, collect stats (or collect statistics), and begin transaction.

In a further embodiment, live database activity reflection tool module 302 may sanitize or otherwise refine the repository of live database activity. Additionally or alternatively, live database activity reflection tool module 302 may otherwise pre-process each outputted log that meets the one or more specified criterion. For example, live database activity reflection tool module 302 may otherwise pre-process each such log by recording it within the repository of live database activity according to a live database table to which this to-be-recorded outputted log pertains. In other words, when recording an outputted log, live database activity reflection tool module 302 may associate that log with one or more other recorded logs that pertain to the same table (e.g., the to-be-recorded outputted log's live database table).

In yet a further embodiment, live database activity reflection tool module 302 may utilize the repository of live database activity to predict or anticipate live database activity. For example, in the embodiment, after recording an outputted log that indicates a change to data of a required table (e.g., a table that is required by a process that is to-be-migrated), live database activity reflection tool module 302 may anticipate that: (1) the feed will output at least one subsequent log that indicates at least one subsequent change to the required table's data; and (2) one from among the at least one subsequent log will include an indication that comprises a final change to the required table.

In the embodiment, live database activity reflection tool module 302 may predict when it will receive a log that includes an indication of a final change to a required table. For example, in the embodiment, live database activity reflection tool module 302 may predict that it will receive such a log by a predetermined point in time or within a predetermined period. In the embodiment, if this log of a final change is not received by the predetermined time or within the predetermined period, live database activity reflection tool module 302 may issue an alert and/or determine (or require a determination of) what caused the unrealized expectation (i.e., why the log of the final change has not been received).

In the embodiment, live database activity reflection tool module 302 may determine that it has received a log of the final change when live database activity reflection tool module 302 recognizes that the feed's output comprises patterns that are associated with the final change's log. In an exemplary embodiment, a new type of pattern may be associated with a taxonomy of data change patterns when live database activity reflection tool module 302 determines that the unrealized expectation has occurred due to live database activity reflection tool module 302's failure to correctly recognize at least one from among a log that led to the unrealized expectation and the log of the final change.

In the exemplary embodiment, the new type of pattern may be based on the determined cause of the unrealized expectation, and this determined cause may comprise at least one from among a correct pattern of the log of the final change and a correct pattern of the log that led to the unrealized expectation. In the embodiment, live database activity reflection tool module 302 may utilize pattern recognition to identify (or detect) when the output of the feed indicates that specified data change activities have occurred within the live database.

Accordingly, at step S404, live database activity reflection tool module 302 monitors the feed in order to identify or detect updates (or data changes) to the live database. Live database activity reflection tool module 302 may monitor the feed continuously or at discrete intervals, which may be determined by a predetermined period or by a triggering event, such as establishing/re-establishing a connection or receiving an instruction to interrupt/resume monitoring. Additionally or alternatively, live database activity reflection tool module 302 may monitor the feed indefinitely or for a predetermined duration of time.

In an embodiment, the output of the feed may comprise a buffer that stores logs that are output when the feed is offline (i.e., when the feed cannot output its logs to module 302 due to an unavailability of a connection or interface between module 302 and the feed). In the embodiment, live database activity reflection tool module 302 receives output from the feed in real-time (e.g., microseconds or milliseconds in slow systems) when the feed is not offline.

Additionally, in the embodiment, when the feed is offline, the output of the feed may be buffered until the feed goes back online (i.e., is no longer offline) and, after the feed is no longer offline, the buffered output of the feed may be immediately outputted to live database activity reflection tool module 302 (or the buffered output may be outputted after a request for the buffered output is received from live database activity reflection tool module 302).

In process 400, at step S406, live database activity reflection tool module 302 evaluates the output of the feed against a taxonomy of data change patterns. For the purposes of this disclosure, the taxonomy of data change patterns (also called an activity log taxonomy) may refer to a set of output patterns and their respective data change activities. For example, in an embodiment, the activity log taxonomy/taxonomy of data change patterns comprises a set of classifications or categorizations that associate output log patterns with one or more distinct data change activities, such as a completion of a series of changes to data/contents of a particular table.

In an embodiment, at step S406, live database activity reflection tool module 302 may utilize a first artificial intelligence and machine learning (AI/ML) model to evaluate the output of the feed against the activity log taxonomy. The first AI/ML model may be trained to: (1) identify when the feed's output matches a pattern that has been categorized within the activity log taxonomy; and (2) determine a data change activity (e.g., a completion of a series of changes to a particular table's content) that is associated with the matching pattern of outputted logs (i.e., the feed's output).

Accordingly, the first AI/ML model may be trained with training data, i.e., each distinct set of update session logs or activities that has been categorized as a distinct type of update session. In the embodiment, the taxonomy of data change patterns may be generated, updated, retrained and/or refined based on new training data/patterns and/or by a second AI/ML model that is trained to analyze the repository of live database activity to identify new patterns and their respective data change activities.

In process 400, at step S408, live database activity reflection tool module 302 detects that the feed has outputted at least one activity log that indicates a completion of a series of changes to a particular table's content. In other words, at step S408 live database activity reflection tool module 302 detects the completion of a series of changes to a particular table's content by evaluating the feed's output against the activity log taxonomy. For the purposes of this disclosure, a series of changes to a particular table's content may be referred to as an update session.

In process 400, at step S410, live database activity reflection tool module 302 searches the database activity repository (or a repository of the live database or the first database platform's infrastructure) for logs that correspond to an update session whose completion was detected at step S408. As a result of this search, live database activity reflection tool module 302 may identify one or more outputted logs that correspond to the update session whose completion was detected at step S408 and, after these corresponding logs have been identified, live database activity reflection tool module 302 may group them together or otherwise associate them with one another. Thereafter, based on the activity log taxonomy's classification of this grouping's activity pattern(s), live database activity reflection tool module 302 may determine a data change classification for the update session that was detected at step S408.

In process 400, at step S412, live database activity reflection tool module 302 determines a set of data changes for each of the update session's corresponding logs. More particularly, at step S412, live database activity reflection tool module 302 may determine the set of data changes based on (1) the data change classification of, and (2) information within the logs that correspond to, the update session whose completion was detected at step S408. Accordingly, at step S412, live database activity reflection tool module 302 utilizes an update session's corresponding logs to identify their respectively corresponding data changes.

In process 400, at step S414, live database activity reflection tool module 302 respectively transforms the set of data changes into a corresponding set of steps or operations that mirrors the set of data changes when the set of data changes is performed. In an embodiment, at step S414, live database activity reflection tool module 302 may transform the set of data changes (e.g., a first set of data changes) into the corresponding set of steps or operations based on (1) the data change classification of, and (2) information within the logs that correspond to, the update session whose completion was detected at step S408.

In process 400, at step S416, live database activity reflection tool module 302 incorporates the set of data changes (e.g., the first set of data changes) into a copy of the detected update session completion's table by having the set of data changes (or the first set of corresponding steps) executed on another database platform (e.g., the second database platform). In an embodiment, the other database platform (e.g., the second database platform) may be a database platform onto which the live database will be, has been, or is being duplicated.

In an exemplary embodiment, at step S416, live database activity reflection tool module 302 may incorporate the first set of data changes into the copy of the detected update session completion's table, by compiling an electronic file that comprises an aggregate data change that comprises an aggregate of the first set of data changes (or the aggregate data change's respectively corresponding operations). After the electronic file comprising each of the aggregate data change (or its corresponding set of operations) has been compiled, live database activity reflection tool module 302 may transmit that electronic file to another database platform (e.g., the second database platform).

In the exemplary embodiment, live database activity reflection tool module 302 may transmit the electronic file in a manner where the aggregate data change (or its corresponding set of operations) is ultimately executed/performed at the other database platform (e.g., the second database platform). For example, the electronic file may comprise a set of executable instructions that executes/performs the aggregate data change (or its corresponding set of operations) at the other database platform (e.g., the second database platform).

After the aggregate data change (or its corresponding set of operations) has been executed/performed on the copy of the live database on the other database platform (e.g., the second database platform), process 400 may conclude or return to step S404 and continue monitoring the output of the feed of the live database's activity logs for updates.

Accordingly, embodiments of the herein disclosed invention may be applied to a difficulty that arises with regard to the migration of a data warehouse (e.g., a database) and other hosted services from one host to another. Particularly, regarding the migration of very large data warehouses that have more than 20 thousand active tables (i.e., tables that are actively being accessed and updated). A difficulty that likely arises during the migration of such data warehouses, is that all of an organization's data scientists and data analysts' daily activities may rely on access to the data warehouse.

In an embodiment, three (3) types of processes may be running within a generic data warehouse. These three (3) types of processes may comprise processes that ingest data, processes that curate data, and processes that consume data generated by ingestion and curation processes. In the embodiment, ingest processes may comprise transaction-based processes that seed a data warehouse with its underlying content, and curator processes may comprise data analysis processes that utilize the underlying content to generate analytics data (e.g., statistics) regarding the data warehouse's underlying content. Additionally, in the embodiment, consumer processes may comprise processes that consumes the generated analytics data and the data warehouse's underlying content. In this embodiment, due to these cross dependencies of the data produced by the curator processes and consumer processes, it is necessary to migrate all the data warehouse's underlying content as well as the ingest, curator and consumer processes mentioned above.

Therefore, to migrate a data warehouse that includes cross-dependencies like the cross-dependencies that are mentioned above, a database activity reflection tool may be utilized to (1) reflect active tables of the data warehouse onto a copy of that data warehouse and, thereby, (2) facilitate an expedited migration of one or more processes running on the data warehouse. Accordingly, by reflecting a data warehouse's active tables onto a copy of the data warehouse, a database activity reflection tool synthesizes data gravity within the data warehouse copy, which facilitates an expedited migration of data warehouse processes that rely on these active tables.

In an embodiment, a "reflection" process may require that both "cold" (e.g., rarely accessed) storage, as well as "hot" (e.g., frequently accessed) storage, be reflected onto a copy of the data warehouse system. However, limiting resources to the capture, extraction, transfer, and loading (ETL) of "hot" storage data, significantly reduces costs with little to no tradeoff because the only tradeoff under these circumstances is that cold storage data activity will remain unavailable until the data warehouse is copied in its entirety.

The "redo log" feature of conventional transaction-based database systems may be utilized to replicate database activities within a copy of that database. The "redo log" feature records historical logs of all changes made to the database. However, unlike transaction-based database systems, a data warehouse may not always provide "redo log" functionality due to the sheer volume of data (in the range of petabytes/PBs) that is stored within a data warehouse. In addition, due to the way that a data warehouse is updated, the "redo log" feature may not be limited to selected tables in in the warehouse.

In an exemplary embodiment, for the operations "select from table A" and "insert into table B," both tables A and B may need to be "reflected" onto a copy of their host data warehouse, which likely results in significant increases in costs (e.g., storage, compute and network costs) in a cloud migration setup, for example, because these operations may just be towards an interim state of a series changes which must be made in the table before it can be consumed. Therefore, it may not be desirable to replicate or reflect every operation that is performed on an active or reflected table.

In an embodiment, the data reflection disclosed herein is generic, light weight, efficient, and built in a way will work with any data warehouse to/from any data source with an audit log.

The system disclosed herein may comprise a data change detection and extraction module; a change data transfer to target environment module; a change data apply module; and an ETL pattern calculation, prediction, alerting and dashboard module. In an embodiment, the data change detection and extraction module may comprise an audit log collector module, an export job creator module, and an export job scheduler and executor module. Additionally, in the embodiment, the export job scheduler and executor module may depend on the export job creator module, which may in turn depend on the audit log collector.

The data change detection and extraction module—may be a core component of a system that may be responsible for collecting and mining audit logs and creating and executing export jobs. In an embodiment, the data change detection and extraction module may output "delta" data files that are ready to be incorporated into copy of a data warehouse in order to synchronize that copy with its source.

The audit log collector module—may run independently on a server and may be responsible for connecting to a source data warehouse system and collecting audit logs that pertain to relevant tables.

The export job creator module—may also run independently on a server. However, the export job creator may be responsible for detecting a change data capture (CDC) event and creating export jobs.

The export job scheduler and executor module—may run independently on a server as well. In an embodiment, the export job scheduler and executor module may be responsible for executing export jobs in the most efficient way possible (i.e., less/least amount of steps and/or processing load). After a job's execution, the export job scheduler and executor module may also be responsible for creating a file (e.g., a manifest file) that includes instructions on how to implement any necessary record changes in a target environment (for example, 1000 records may be extracted for a "change" operation, where 500 records are update to the target table 500 are new records to be inserted into the target table).

The change data transfer to target environment module—may transmit changed data files containing changed records to a target environment (data warehouse' copy) after the records are extracted.

The change data apply module—may utilize change data files and/or instructions stored in a file generated by the export job scheduler and executor module above. In an embodiment, the change data apply module component may be responsible for applying the changed records to a target environment in the most efficient way.

The ETL pattern calculation, prediction, alerting and dashboard module—may predict CDC events based on a table's historical CDC event pattern. In an embodiment, the ETL pattern calculation, prediction, alerting and dashboard module may also generate an alert when the event is not detected within a predicted timeframe. In an embodiment, the ETL pattern calculation, prediction, alerting and dashboard module may also generate when an abnormal pattern or event is detected. Moreover, every end-to-end status and alert of this module and its system may be displayed on a dashboard within a graphical user interface (GUI).

In an exemplary embodiment, component of the present invention may be as follows.

An audit log collector module—may be the first step in an exemplary process. In an embodiment, the audit log collector module may collect audit logs from a source system and may perform some initial pre-processing operations on the audit logs. The audit log collector module may run at predetermined times (every 1, 2, 5, 10 minutes, etc.) through an external scheduler service, at which time the audit log collector module may connect to the source system and pull audit logs into an application database. The Audit log collector may also pre-process or sanitize collected logs by performing one or more from among de-duplication, table name extraction, and/or normalization operations on those logs before saving them to the local database.

In the exemplary embodiment, the locally saved logs may be used as the source of a "export job creator" module. The audit log collector module may be relied on as a failsafe and it may be limited to the acquisition of logs meeting one or more of the following criteria: (1) a type of log that is related to a "data change", such as an "INSERT", "UPDATE", "DELETE", "COLLECT STATS", and/or "BEGIN TRANSACTION" log; (2) a log that concerns a table that needs to be reflected; and (3) a log that concerns an event or activity that occurred within the last "n" minutes, where n=a maximum amount of time (e.g., 1, 2, 5, 10 minutes, etc.) that has elapsed since a time of a most recent successful collection of one or more logs+a predetermined amount of overlap time (e.g., 5, 10, 15 minutes, etc.).

In the exemplary embodiment, the audit log (e.g., its feed) may be self-healing. Accordingly, the audit log collector module's operations may be interrupted (or halted) until the audit log heals itself so that the audit log collector module may then resume and pull (or recover) any pertinent logs that have been generated since the most recent successful collection of one or more logs. In addition, the audit log collector module may pull any pertinent logs that have been missed, lost, or overlooked.

In an embodiment, the present invention's reflection pipelines may be driven by "CDC events". For the purposes of this disclosure, a "CDC event" may refer to a "performance of one or more operations (e.g., data change operations) that ultimately place their changed table(s) into a 'stable' state", and a "stable" state may refer to a state where no further data change operation(s) is/are pending for a table that is an object of the one or more operations (e.g., data change operations).

Unlike transaction-based systems, a data warehouse system's content may be updated via a capture, extraction, transfer, and load (ETL) batch or micro batch (i.e., a subset of an ETL batch) because one or more intermediate steps or stages are usually required before a data warehouse update's table(s) may be considered to have a "stable" state. Additionally, the volume of a data affected by a data warehouse update is typically large. Therefore, the large amount of data and temporary support tables that would be required to replicate each step of an of a data warehouse update, make this approach inefficient and costly.

Consider the following examples.

Example 1. On the source tables, the logs in the audit table may include: a) load temporary table A from a flat file, e.g., "c:\helloworld.txt"; b) delete data from table B; and c) merge temporary table A with table B.

This example shows a typical sequence of how a table, such as table B, may be loaded into a data warehouse. The following are a few key considerations to keep in mind when reflecting a table such as table B onto a target: a) table B is not useful until the step c above is executed; and b) in a physical level replication solution, the "helloworld.txt", temporary table A, and table B will require three different replication steps. As a result, data will need to be transmitted to, and processed at, the target on three different occasions. However, interim states of table B are not useful and thus likely merely introduce costly inefficiencies and complexities. Therefore, such transactions are considered in their context (e.g., the target and whether it is a different type of system).

In an exemplary embodiment, transmitting the above instructions of example 1 as a CDC event may involve: a) combining the instructions (i.e., operations a, b, and c) into single (CDC) event; b) waiting until after the final instruction (namely, operation c) is received before extracting and transferring any data from storage; c) utilizing the final instruction of example 1's sequence of instructions as a "trigger event"; and d) defining the "pattern" (load→delete→merge) of that trigger event as a "trigger pattern", which enables a single transmission to be utilized to replicate the sequence within any type of target system in real-time (note: "real-time" may refer to "a latency of as little as a few microseconds that does not exceed a couple milliseconds"). Therefore, considerations such as transaction context, and roll back events for preserving data integrity no longer need to be taken into account because CDC events are not considered to be complete until their "trigger event" (or final operation/instruction) occurs.

After defining a "CDC event" and a "trigger event", an "extraction pattern" must be defined in order to identify what exactly must be extracted from a storage (a set of source records), which may be facilitated by utilizing a mechanism such as a WHERE clause, for example, to limit an extraction to a defined subset of source records. Accordingly, although a data warehouse system may contain millions or even billions of distinct records, the present invention limits its extractions to the least amount of data (e.g., just the required subset) necessary for an extraction's corresponding CDC event and, thereby, conserves its resources.

Based on the various ETL load patterns of activities that occur within a data warehouse, an extraction predicate can often be extracted through an audit log evaluation in order to determine an "extract pattern." For example, Consider the following.

Example 2. An audit table may include the following logs: a) load temporary table A from a flat file, e.g., "c:\helloworld.txt"; b) delete data from table B, where "run_id=123" for example; and c) insert contents of temporary table A into table B.

This sequence of operations exemplifies a common pattern of logs corresponding to an upload of data into a date warehouse. However, it should be noted that the exemplary set of logs in example 2 does perform some housekeeping before uploading data into its target (table B).

In an embodiment, to reflect the instructions of example 2 as a CDC event and onto a target, the present invention may: a) combine the instructions (operations a, b and c) into a single (CDC) event, and define operation c as its "trigger event"; b) utilize operation b's query (or SQL statement, for example) to define an "extract pattern" by obtaining the data (i.e., "123") that is the object of operation b and defining "run_id" as the "extract variable"; and c) utilize the "run_id=123" as the extraction predicate for extracting data from table B by defining table B's delta as merely comprising the stored record where "run_id=123."

In an embodiment, hundreds (if not all) of a source system's ETL jobs may be analyzed to determine their extract patterns. In an additional or alternative embodiment, active tables (e.g., working/staging tables) may be leveraged to obtain any data extraction predicates (e.g., extract pattern, extract variable(s), etc.) that cannot be determined from the source system's analyzed ETL jobs.

Consider the following exemplary export job process as it relates to a "CDC event" and its "extract pattern". In an embodiment, the exemplary process's flow may comprise: (1) searching for new logs at predetermined time intervals (every 1, 2, 5 and/or 10 minutes, etc.), for example, by initiating a "create export" job and/or querying for newly inserted logs saved by the "audit log collector"; (2) grouping new logs based on their source table and arranging them in descending order according to their; (3) utilizing a pattern recognition algorithm or pattern recognition module to evaluate every log to determine whether it includes a "trigger pattern" that matches any patterns from among a set of previously determined (i.e., predetermined) "trigger patterns"; (4) triggering a "CDC event" when a log that includes a matching "trigger pattern" is recognized, then searching the newly inserted logs saved by the "audit log collector" in order to obtain the extraction pattern(s) of every undigested (i.e., not yet processed and/or stored) log that pertains to the CDC event's table; and (5) initiating a generation of a new source extraction job after the extraction pattern(s) of every undigested log that pertains to the CDC event's table has been obtained. In an embodiment, after each log mentioned above is processed, its status may be updated to indicate that it has been processed (i.e., digested) so that such a processed (or otherwise digested) log is not regurgitated (or unnecessarily processed again).

In an embodiment, an out-of-the-ordinary (i.e., abnormal) "CDC event" may occur when a source system is undergoing maintenance or a manual fix, which may lead to log sequences that do not match any predetermined "trigger patterns". In this embodiment, the following sequence may occur when such an out-of-the-ordinary "CDC event" arises from a source system: (1) routine pattern matching will not identify (or recognize) a "triggering event" for such an abnormal/unrecognized update (or CDC event) and the unrecognized update (or CDC event's entries (i.e., logs) will remain undigested (i.e., with a status of "new"), then (2) a monitoring and alerting module may issue an alert after a log remains undigested for a predetermined (e.g., 1, 2, 5 or 10 minutes) period.

In an additional or alternative embodiment, an anti ETL pattern record level update may be identified from one or more source tables. In this embodiment, there may be a data warehouse source that issues individual INSERT/UPDATE operations to its tables, instead of batch loading them into its tables. Rather than extracting and loading each job one record at a time, "window batching" may be utilized to reflect operations onto a copy of the source table(s). In such embodiments, each INSERT/UPDATE operation may be processed as a distinct "CDC event", where the INSERT/UPDATE statement itself is the triggering event, and a predetermined interval (e.g., 5, 10, 15, 30, 60, 90, 120 minutes, etc.) may be set for processing (extracting and loading) a source table's undigested logs.

For Example, in such embodiments, table A may be associated with a "predetermined interval" of "60 minutes", and table A may also be associated with the following logs: 10:01:01 INSERT values (a, b, c . . . etc.) into table A; 10:01:02 INSERT values (l, m, n . . . etc.) into table A; and 10:01:03 INSERT values (x, y, z . . . etc.) into table A. Accordingly, in this example, an extraction job will be created at the first log "10:01:01". However, the next job will not be created until 11:01.01 (i.e., 10:01:01+60 minutes).

In an embodiment, a pending extraction from a recently updated external table may be delayed. For example, in an embodiment where all of a CDC event's activities cannot be captured accurately, the activities that are captured may be limited to CDC "trigger events." In an exemplary embodiment, there may be no details available for an external script that is running on a table. In the embodiment, when the external script is expected to run for about an hour, the extract operation (or extraction) may be set to a predetermined period such as 90 minutes, for example. Accordingly, the extract operation (or extraction) will not be performed until 90 minutes have elapsed after the detection of CDC event's "trigger event."

In further embodiments, a combination of the above-mentioned "delayed extraction" and "window batching" techniques may be utilized to support several other types of use cases.

To configure patterns, the detection of a "triggering pattern" and an "extraction pattern" may be driven by their respective definition, which is required for each updated table. In an exemplary embodiment, a number of patterns may be defined manually via a command-line based utility (or module) so tables can be configured by an administrator (classification). Accordingly, a model may be trained to provide different patterns to a user or administrator.

Turning to the change data apply module mentioned above, it should be noted that compute resource utilization is necessary to apply data changes to a target system and, unlike dedicated on-premise data centers, most cloud-based compute resources utilize a pay-as-you-go model where resources may be conserved and/or dynamically consumed as needed. Therefore, although the present invention's compute power may not be constrained by its host environment, processing inefficiencies can still be very costly. In an embodiment, a dynamic compute module may be utilized to determine the compute-size needed to process a pending compute cluster of jobs (e.g., export jobs) based on the pending compute cluster's contents, such as the number of pending files, size of the files, condition of the pending compute cluster.

In an exemplary embodiment, when a pending compute cluster includes 32 files that each have a size of two gigabytes (2 GB), then utilizing a single 128-thread compute cluster to process this pending cluster may take 10 minutes and cost $10 or more to complete. However, utilizing the "data reflection" technique disclose herein enables a 32-thread compute cluster to be utilized to process this exemplary embodiment's pending cluster in 12 minutes for a cost of just $2.

In an embodiment, the monitoring and alerting module mentioned above may comprise an algorithm that determines a frequency of various types of data changes and may thereby predict/expect an upcoming/next data change job, rather than require that these frequencies be setup, and that alerts be sent, manually for each job (or for each table's updates).

Accordingly, the present invention provides a system that synthesizes data gravity within at least one copy of a live database's most frequently accessed tables by reflecting a source instance of those tables onto the copy and, thereby, enables expedited migrations of processes running on the live database.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A system for synchronizing a copy of a set of frequently accessed tables of a live database with a source instance of the set of frequently accessed tables, the system comprising:
a processor; and
memory storing instructions that, when executed by the processor, cause the processor to perform operations comprising:
monitoring an output of a feed that outputs a respective log of each activity that occurs on a source database platform;
evaluating the output of the feed against an update session taxonomy to determine whether the respective log indicates a completion of a first update session of first updates to the set of frequently accessed tables of the source instance of the live database, wherein the first update session comprises a first set of data changes, and wherein the source database platform comprises the source instance;
when the respective log indicates the completion of the first update session, searching a historical database activity repository to detect each respective log that corresponds to the first update session;
identifying a corresponding data change classification for the first update session, based on the update session taxonomy and corresponding logs of the first update session;
determining the first set of data changes based on the corresponding data change classification and the corresponding logs of the first update session; and
applying the first set of data changes on the copy of the set of frequently accessed tables, wherein the copy of the set of frequently accessed tables is stored within a target database platform.

2. The system of claim 1, wherein the instructions, when executed by the processor, cause the processor to perform further operations comprising: restoring a connection to the output of the feed,
wherein, when the feed is not offline, each respective log is generated and outputted by the feed immediately after each activity is completed, and
wherein, when the feed is offline, the output of the feed is buffered and the buffered output of the feed is outputted immediately after the restoring.

3. The system of claim 1, wherein each respective log that corresponds to the first update session is determined by an artificial intelligence and machine learning (AI/ML) model that has been trained based on each distinct set of update session logs that has been categorized as a distinct type of update session.

4. The system of claim 3, wherein the update session taxonomy is created and refined by the AI/ML model based on update session training data.

5. The system of claim 3, wherein when the instructions are executed by the processor, the evaluating further comprises: utilizing the AI/ML model to determine whether the respective log indicates the completion of the first update session.

6. The system of claim 4, wherein the instructions, when executed by the processor, cause the processor to perform further operations comprising: retraining the AI/ML model based on a set of historical database activity logs that has been categorized as a new type of update session.

7. The system of claim 1, wherein when the instructions are executed by the processor, the applying further comprises:
transforming the first set of data changes into a first set of corresponding steps; and
incorporating the first set of data changes into the copy of the set of frequently accessed tables by having the first set of corresponding steps executed with respect to the target database platform.

8. The system of claim 1,
wherein the respective log indicates the completion of the first update session, after the update session taxonomy has been utilized to determine that a set of previously generated logs indicate that the first update session exists; and wherein an alert is issued when the completion of the first update session has not been detected after a predetermined duration of time elapses subsequent to a determination that the set of previously generated logs indicate that the first update session exists.

9. The system of claim 1, wherein the instructions, when executed by the processor, cause the processor to perform further operations comprising:

determining that the respective log comprises at least one from among a set of database activities that includes insert, update, delete, collect statistics and begin transaction; and storing, within the historical database activity repository, the respective log after the feed outputs the respective log.

10. The method of claim 1, wherein the update session taxonomy correlates sets of output patterns with respectively corresponding data change activity categorizations.

11. A method for synchronizing a copy of a set of frequently accessed tables of a live database with a source instance of the set of frequently accessed tables, the method comprising:

monitoring an output of a feed that outputs a respective log of each activity that occurs on a source database platform;

evaluating the output of the feed against an update session taxonomy to determine whether the respective log indicates a completion of a first update session of first updates to the set of frequently accessed tables of the source instance of the live database, wherein the first update session comprises a first set of data changes, and wherein the source database platform comprises the source instance;

when the respective log indicates the completion of the first update session, searching a historical database activity repository to detect each respective log that corresponds to the first update session;

identifying a corresponding data change classification for the first update session, based on the update session taxonomy and corresponding logs of the first update session;

determining the first set of data changes based on the corresponding data change classification and the corresponding logs of the first update session; and applying the first set of data changes on the copy of the set of frequently accessed tables, wherein the copy of the set of frequently accessed tables is stored within a target database platform.

12. The method of claim 11, further comprising: restoring a connection to the output of the feed, wherein, when the feed is not offline, each respective log is generated and outputted by the feed immediately after each activity is completed, and wherein, when the feed is offline, the output of the feed is buffered and the buffered output of the feed is outputted immediately after the restoring.

13. The method of claim 11, wherein each respective log that corresponds to the first update session is determined by an artificial intelligence and machine learning (AI/ML) model that has been trained based on each distinct set of update session logs that has been categorized as a distinct type of update session.

14. The method of claim 13, wherein the update session taxonomy is created and refined by the AI/ML model based on update session training data.

15. The method of claim 13, wherein the evaluating further comprises: utilizing the AI/ML model to determine whether the respective log indicates the completion of the first update session.

16. The method of claim 11, wherein the applying further comprises:

transforming the first set of data changes into a first set of corresponding steps; and incorporating the first set of data changes into the copy of the set of frequently accessed tables by having the first set of corresponding steps executed with respect to the target database platform.

17. The method of claim 11, wherein the respective log indicates the completion of the first update session, after the update session taxonomy has been utilized to determine that a set of previously generated logs indicate that the first update session exists; and wherein an alert is issued when the completion of the first update session has not been detected after a predetermined duration of time elapses subsequent to a determination that the set of previously generated logs indicate that the first update session exists.

18. The method of claim 11, further comprising:

determining that the respective log comprises at least one from among a set of database activities that includes insert, update, delete, collect statistics and begin transaction; and storing, within the historical database activity repository, the respective log after the feed outputs the respective log.

19. A non-transitory computer-readable storage medium for synchronizing a copy of set of frequently accessed tables of a live database with a source instance of the set of frequently accessed tables, the computer-readable storage medium storing instructions that, when executed by a processor, cause the processor to perform operations comprising:

monitoring an output of a feed that outputs a respective log of each activity that occurs on a source database platform;

evaluating the output of the feed against an update session taxonomy to determine whether the respective log indicates a completion of a first update session of first updates to the set of frequently accessed tables of the source instance of the live database, wherein the first update session comprises a first set of data changes, and wherein the source database platform comprises the source instance;

when the respective log indicates the completion of the first update session, searching a historical database activity repository to detect each respective log that corresponds to the first update session;

identifying a corresponding data change classification for the first update session, based on the update session taxonomy and corresponding logs of the first update session; and determining the first set of data changes based on the corresponding data change classification and the corresponding logs of the first update session.

20. The computer-readable storage medium of claim 19, wherein each respective log that corresponds to the first update session is determined by an artificial intelligence and machine learning (AI/ML) model that has been trained based on update session training data that comprises each distinct set of update session logs that has been categorized as a distinct type of update session, and wherein when the instructions are executed by the processor, the evaluating further comprises: utilizing the AI/ML model to determine whether the respective log indicates the completion of the first update session.

\* \* \* \* \*